United States Patent [19]

Pinnavaia et al.

[11] Patent Number: 4,665,044
[45] Date of Patent: * May 12, 1987

[54] PILLARED AND DELAMINATED CLAYS CONTAINING IRON

[75] Inventors: Thomas J. Pinnavaia, East Lansing, Mich.; Ming S. Tzou, Evanston, Ill.

[73] Assignee: Michigan State University, East Lansing, Mich.

[*] Notice: The portion of the term of this patent subsequent to Dec. 16, 2003 has been disclaimed.

[21] Appl. No.: 723,661

[22] Filed: Apr. 16, 1985

Related U.S. Application Data

[63] Continuation-in-part of Ser. No. 641,912, Aug. 17, 1984, Pat. No. 4,629,712.

[51] Int. Cl.$^4$ .............................................. B01J 21/16
[52] U.S. Cl. ..................................................... 502/84
[58] Field of Search ............................. 502/60, 80, 84

[56] References Cited

U.S. PATENT DOCUMENTS 4,497,903  2/1985  Kibby et al. ..................... 502/84 X
4,510,257  4/1985  Lewis et al. ..................... 502/84 X
4,515,901  5/1985  Elattar ................................. 502/84
4,546,091  10/1985  Sheppard et al. ..................... 502/84

*Primary Examiner*—Carl F. Dees
*Attorney, Agent, or Firm*—Stefan J. Klauber

[57] ABSTRACT

A process for preparing a stable pillared layered lattice clay, comprising the steps of preparing a hydrolyzed solution of ferric ion by reacting a solution of a salt of the said metal with a base at temperatures in the range of 22° to 28° C. and aging the solution within said temperature range to develop the hydrolyzed pillaring agent, contacting an aqueous slurry of a layer lattice clay selected from the group consisting of smectites, vermiculite, and flurohectorite, with said hydrolyzed solution, and recovering the intercalated pillared clay product. The resultant pillared clay product has a unit clay cell containing from 6.1 to 9.8 ferric ions per cell, and has a repeating spacing of from about 22 to 28 Angstroms. The product is particularly useful in catalyzing conversion processes such as the well-known Fischer-Tropsch process.

14 Claims, 1 Drawing Figure

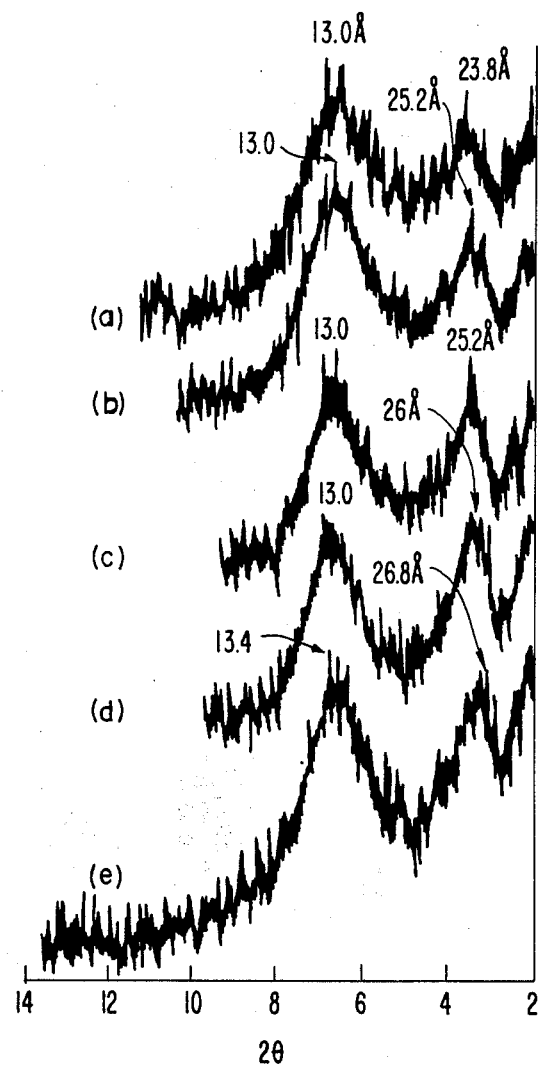
XRD PATTERNS (CuK$_\alpha$) FOR AIR-DRIED PILLARED MONTMORILLONITES CONTAINING POLYOXYIRON CATIONS.

1

PILLARED AND DELAMINATED CLAYS CONTAINING IRON

RELATED APPLICATION

This application is a continuation-in-part of application Ser. No. 641,912, filed Aug. 17, 1984 U.S. Pat. No. 4,629,712 and entitled "Delaminated Clay Materials."

FIELD OF THE INVENTION

This invention relates generally to layered lattice silicates, and more specifically relates to pillared and to delaminated layered lattice silicates, such as clays of this type belonging to the smectite group.

BACKGROUND OF THE INVENTION

Naturally occurring and synthetic smectite clays such as bentonite, montmorillonite, hectorite, fluorohectorite, saponite, beidellite, nontronite, and related analogs, are generally comprised of layers which can be visulized as a sandwich or platelet containing two outer sheets of silica tetrahedra and an inner or central octahedral sheet of a hydrous metal oxide, such as alumina or magnesia octahedra. These platelets are stacked one upon the other to yield a clay particle. Normally, this arrangement yields a repeating structure ($d_{001}$) about every ten Angstroms to give a material with relatively low surface areas.

The alkali metal and alkaline earth metal ions in ordinary smectite clays can be replaced by ion exchange with polyoxymetal cations. Polyoxycations in the size range of from about 4 to 10 Angstroms function as molecular props or "pillars", and serve to keep the clay layers separated in the absence of a swelling solvent. Thus, whereas the layers of an ordinary smectite collapse in van der Waals contact when heated to elevated temperatures to give a material with low surface area (approximately 10–30 $m^2/g$), smectites pillared by polyoxycations can exhibit $d_{001}$ distances in the 14.5 to 20 Angstrom range at temperatures to 500° C., as well as surface areas in the range of from 200 to 400 square meters per gram.

General background respecting pillared clay products and processes for producing same can be found in a number of issued United States patents, including among others, U.S. Pat. Nos. 4,271,043 and 4,248,739 to Vaughan et al, which relates to methods for preparing pillared interlayered clays by reacting a smectite type clay such as a bentonite with high molecular weight cationic metal complexes, such as those of aluminum, zirconium or titanium.

Similarly, U.S. Pat. No. 4,216,188 to Shabria et al discloses preparation of a montmorillonite which is cross-linked with aluminum hydroxide or with chromium hydroxide.

U.S. Pat. No. 4,410,751 to Shin et al in part discloses a catalyst comprised of a smectite such as a montmorillonite, having zirconium oxide intercalated to form pillars between sheets of $S_iO_4$ tetrahedra of adjacent aluminosilicate layers.

Of particular interest in relation to pillared interlayered clays of the type heretofore discussed, are those in which transition metal-based complexes are interlayered—this in view of the fact that oxides of such metals in catalysts are known to demonstrate high catalytic activities.

In the aforementioned Shabria et al, U.S. Pat. No. 4,216,188, e.g. chromium hydroxide is thus disclosed as a pillaring agent. The hydroxide treating solution in Shabria is prepared and aged at room temperatures; and the resultant pillared clay samples, even without being subjected to high temperature heatings, have repeating ($d_{001}$) spacings of the order of about 18 Angstroms. Specific surface areas are in the range of about 160 to 240 $m^2/g$, which is relatively low.

Further to be noted is that G. W. Brindley and S. Yamanaka, *Amer. Mineral.*, 64, 830–835 (1979) have reported a chromium interlayered montmorillonite. This product had $d_{001} = 17.7$ A at 25° and 16.5 A at 200°, contained 1.88 Cr/unit cell, and exhibited a surface area of 280 $m^2/g$ when dehydrated in air at 200° C.

In U.S. Pat. No. 4,452,910 to Hopkins et al expanded layer smectites having a regular pore structure and suitable for catalytic uses, are prepared by a process wherein the clay is treated with a chromium-oligomer solution and subjected to a stabilization heat treatment in an inert gas atmosphere. The chromium-oligomer solutions in Hopkins et al are prepared at room temperatures, and aged at such temperatures. The resultant pillared clay products have repeating spacings $d_{001}$ of the order of 15 Angstroms or less, and surface area of from 44 to 305 square meters per gram, where the treated smectite is a bentonite.

Organic amine complexes of Fe, Co, and Ni have been used by Loeppert, Mortland, and Pinnavaia to prepare expanded clays as disclosed in *Clays and Clay Minerals* 27.201 (1979). These clays, however, are somewhat unstable, since high temperatures destroy the organic complex.

Of additional relevance to this invention is our co-pending application Ser. No. 641,912 filed Aug. 17, 1984, wherein we have disclosed a process for preparing delaminated smectite clay compositions having bimodal pores, which facilitate diffusion of large hydrocarbon molecules. As disclosed therein, the process includes reacting a mixture of a trioctahedral smectite having an average particle size of up to about 500 Angstroms, and in general a lath-shaped morphology, with a polymeric cationic hydroxy metal complex in an aqueous medium, and recovering the reacted clay solids, preferably by freeze-drying. Smectite clay compositions prepared in accordance with the said procedure have a completely or substantially completely "delaminated" structure. In particular, the predominantly edge-to-edge and edge-to-basal association of the clay layers which result yields a combination of macro- meso- and microposity in the clay, which has high thermal stability. The product exhibits an extremely diffuse or substantially non-existent X-ray diffraction pattern.

SUMMARY OF INVENTION

Pursuant to the foregoing, it is an object of the present invention, to provide a process for production of a stable pillared layered lattice silicate which contains interlayered polyoxy metal aggregates based upon iron, wherein the $d_{001}$ repeating spacing is considerably larger than has heretofore been known in the prior art, specifically being of the order of 22 to 28 Angstroms.

It is a further object of the invention, to provide new pillared clay catalysts and absorbents, which have been synthesized by binding polyoxycations of iron in the interlayers of naturally occurring and synthetic 2:1 layered silicate minerals of the swelling type (i.e. smectites, fluorohectorites, hydromicas and vermicullites), which products have unit cells containing from 6:1 to 9.8 ferric ions per unit cell, and which have a repeating spacing of from 22 to 28 Angstroms.

In accordance with the process of the invention, a hydrolyzed solution of ferric ion is initially prepared by reacting a solution of the metal salt with a base at room temperatures, e.g., from about 22°–28° C., and thereupon aging the solution at said temperatures to develop the hydrolyzed pillaring agent. An aqueous slurry of a layered lattice silicate selected from the group consisting of smectites, vermiculites and flurohectorite, is then contacted with the aged hydrolyzed solution, after which the intercalated pillared clay product is recovered. This pillared product can then be heated, as desired, to dehydrate same.

In forming the new pillared or delaminated clays of the present invention, a primary objective was one of forming large polyoxymetal cations in solution which would bind to the clay layers. Moreover, the cations require a method of generation with minimal formation of insoluble metal hydroxides, and a method for removing the insoluble hydroxides which co-precipitate with the flocculated clay. In the instance of polyoxyiron, and in accordance with the present invention, these objectives are attained by carrying out the hydrolysis of Fe solutions under basic conditions; and the extent of solution hydrolysis (polyoxycation formation) is optimized, and the extent of insoluble hydroxide formation minimized, by preferably using solid sodium carbonate as the source of the base. Most of the co-precipitated ferric hydroxide is removed from the flocculated clay by washing the products, using aqueous dispersion/centrifugation techniques.

The resultant polyoxyiron clays are active catalysts for the production of hydrocarbons for $CO/H_2$ (Fischer-Tropsch synthesis).

The salt utilized in preparing the initial ferric ion-containing solution may e.g. comprise ferric chloride, nitrate or perchlorate—ferric sulfate was found to be unsuitable. A 0.1 to 0.2 molar solution is convenient to use; but solutions containing up to the solubility limit for the salt can be used.

The source of base utilized in the process of the invention is preferably sodium carbonate and/or sodium bicarbonate. The ratio of equivalent of base to moles of ferric ion, henceforth designated as "n", is preferably in the range of from about 1.0 to 2.5. The reaction temperatures and aging temperatures are preferably in the range of from about 22 to 28° C., and more optimally around 25° C. The aging may be carried out from about 1.5 hours to 7 days. Where the temperature is of the order of 25° C., from 8 to 16 hours is usually adequate.

The amount of iron in the slurry should be at least 6 moles per unit cell of clay.

Contact between the aqueous clay slurry and the hydrolyzed pillaring solution can be at temperatures between 0° C. and boiling. The product of the reaction can be recovered by centrifuging, followed by washing and air drying. In instances where the clay is of the trioctahedral smectite type and otherwise is in accord with the disclosure of co-pending application Ser. No. 641,912, e.g. a synthetic hectorite such as the LAPONITE ® product of Laporte Industries, Ltd. (U.K.), it is preferable to utilize a freeze drying technique, as opposed to air drying, in order to achieve the desired delamination which is disclosed in greater detail in the said Ser. No. 641,912 application, of which this application is a continuation-in-part.

The product resulting from this invention, thus constitutes a pillared (and in some instances delaminated) clay of the smectite group or flurohectorite or vermiculite, which is intercalated with polyoxycations of iron, and providing a unit cell containing from about 6.1 to 9.8 ferric ions per cell, and having a repeating spacing of at least 22 Angstroms. More generally, the range of the repeating spacing is from about 22 to 28 Angstroms. The surface area of the product is at least 240 square meters per gram, and more generally are in the range of from about 270 to 350 $m^2/g$ after dehydration at 350° C.

By the term "unit cell" is meant the clay cell including 20 oxygens and 4 hydroxyls or 4 fluorines, or combinations of hydroxyls and fluorines.

BRIEF DESCRIPTION OF DRAWING

In the drawing appended hereto:

The FIGURE is a graph depicting the X-ray diffraction (XRD) patterns for samples of air-dried montmorillonites containing polyoxyiron cations, prepared in accordance with the invention.

DESCRIPTION OF PREFERRED EMBODIMENTS

A further understanding of the present invention can be obtained by reference to certain specific Examples which now follow, which are however provided herein for purposes of illustration only, and which are not intended to be delimitive of the invention otherwise described and claimed:

EXAMPLE I

A 0.2 molar solution of $FeCl_3$ was initially prepared. Solid powdered sodium carbonate was added slowly to the ironcontaining solution at 25° C. Carbon dioxide was evolved, and vigorous stirring was utilized. Hydrolysis of the $FeCl_3$ with the sodium carbonate was carried out at 25° C. for an aging period of 24 hours. The value of n was 2.0 and the pH was 1.72. A 1 weight percent aqueous slurry of a natural sodium montmorillonite (Wyoming) was then added to the hydrolyzed ferric solution. The ratio of Fe/Clay was 70 mmole/m.e.q. The slurry and pillaring agent were intermixed for about 1 hour, after which the intercalated clay product was separated from the liquid phase by centrifuging, and the product was washed and then air-dried. The resultant pillared montmorillonite had a composition of 9.75 Fe/unit cell. The product was found to have a repeating spacing $d_{001}$ of 25.2 Angstroms at 25° C., and 22.8 Angstroms at 350° C. The BET ($N_2$) surface area was 244 square meters per gram after dehydration in an inert atmosphere at 350° C. The pore size was greater than 10 Angstroms as evidenced by adsorption of perflurotributylamine (0.96 mmol per gram of the pillared clay).

EXAMPLES II–XIX

Utilizing procedures similar to that described for Example I, a series of further samples of pillared $Na^+$-montmorillonite samples were prepared. Three different hydrolyzing solutions were used, based on $FeCl_3$, and $Fe(NO_3)_3$ and upon $Fe_2(SO_4)_3$. Based spacings of the air-dried products were determined, and yielded the results shown in Table I. (The sample of Example I is also tabalized here). Among other points, it will be noted that the $Fe_2(SO_4)_3$ solution yielded relatively unsatisfactory products:

TABLE I

Basal Spacings in Angstrom Units For Air-Dried Products Obtained by Reaction of $Na^+$—Montmorillonite with Hydrolyzed Ferric Salt Solutions.[a]

| | FeCl$_3$ | | | Fe(NO$_3$)$_3$ | | | Fe$_2$(SO$_4$)$_3$ | | |
|---|---|---|---|---|---|---|---|---|---|
| n[b] | pH | d$_{001}$ | d$_{002}$ | pH | d$_{001}$ | d$_{002}$ | pH | d$_{001}$ | d$_{002}$ |
| 0.0 | 1.38 | 12.28 | — | 1.25 | 12.28 | — | 1.35 | 12.38 | — |
| 0.5 | 1.40 | 19.8 | 12.5 | 1.52 | 18.0 | — | 1.75 | 12.8 | — |
| 1.0 | 1.53 | 23.8 | 13.38 | 1.65 | 23.2 | 13.0 | 2.15 | 12.8 | — |
| 1.5 | 1.60 | 24.5 | 12.0 | 1.75 | 23.2 | 13.2 | 2.25[d] | 12.8 | — |
| 2.0 | 1.72 | 25.2 | 12.6 | 1.82 | 23.8 | 13.38 | 2.28[d] | 12.6 | — |
| 2.5 | 2.18 | 22.0[c] | | 2.05 | 22.1 | 14.48 | 2.30[d] | 12.6 | — |

[a]Concentration of $Fe^{3+}$ is 0.2 M for FeCl$_3$ and Fe(NO$_3$)$_3$ and 0.1 M for Fe$_2$(SO$_4$)$_3$ solution: Fe/clay = 70 mmole/meq.
[b]Base: Na$_2$CO$_3$; solutions are aged at room temperature for 24 hours before reaction.
[c]Broad peak $2\theta$ = 4° to 7°.
[d]precipitate formed in these solutions.

EXAMPLES XX to XXV

In Table 2, the properties of the air-dried products of the invention are shown, in part as a function of aging of the treating solution, for hydrolyzed ferric chloride, nitrate and perchlorate solutions. It will be seen that the iron content of selected products with d$_{001}$ greater than 22 Angstroms at 25° was equivalent to 6.1–9.8 Fe/unit cell. Some fraction of the total iron may be coating exterior surfaces. The surface areas were in the range 270–350 m$^2$/g after dehydration at 350°. High basal spacings (22–26 Angstroms) were also observed after heating to 550° (cf., Table 3). The Fe$_{9.75}$-montmorillonite with a surface area of 244 m$^2$/g exhibited a pore size greater than 10 Angstroms (0.96 mmole perfluorotributylamine/gram).

TABLE II

Properties of Air-Dried Products Obtained by Reaction of $Na^+$—Montmorillonite with Hydrolyzed Ferric Salt Solutions (n = 2.00)

| Salt | Age of Fe$^{3+}$ soln. at 25° | Fe/cell | m$^2$/g | d-Spacing, Å 25° | 110° | 350° | 550° |
|---|---|---|---|---|---|---|---|
| Chloride | 1.5 hr. | — | 270 | 23.8 | — | — | — |
| | 24 hr. | 9.75 | 244 | 25.2 | — | 22.8 | 22.0 |
| Nitrate | 3 hr. | 6.83 | 351 | 27.2 | 25.2 | 24.5 | — |
| | 7 days | 8.80 | 270 | 29.5 | 28.5 | 27.6 | 26.0 |
| Perchlorate | 3 hr. | 6.12 | 343 | 26.8 | 26.8 | 24.5 | — |
| | 7 days | — | — | 25.2 | 24.5 | 23.9 | 23.3 |

EXAMPLES XXVI to XXX

A series of further pillared montmorillonite samples in accordance with the invention, were prepared utilizing the procedures of Example I, with the treating solution including FeCl$_3$ hydrolyzed by addition of solid Na$_2$CO$_3$ (n=2.00) and allowing the solutions to age for (a) 1.5 hr.; (b) 10 hr.; (c) 30 hr.; (d) 50 hr.; and (e) 75 hr. XRD patterns for the air-dried samples are shown in the FIGURE.

EXAMPLE XXXI

An Fe$_{9.75}$-montmorillonite sample prepared as in Example I was evaluated and was shown to be an active catalyst for the production of hydrocarbons for CO/H$_2$ (Fischer-Tropsch synthesis). Under reaction conditions of 275° C., 120 psi, and a CO/H$_2$ ratio of 1:2 the distribution of C$_1$–C$_6$ hydrocarbon followed a Schutz-Flory distribution with $\sigma$=0.45.

The present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly, the invention is to be broadly construed, and limited only by the scope and spirit of the claims now appended hereto.

We claim:

1. A process for preparing a stable pillared layered lattice clay, comprising the steps of:
    (a) preparing a hydrolyzed solution of ferric ion by reacting a solution of a salt of the said metal with a base at temperatures in the range of 22° to 28° C. and aging the solution within said temperature range to develop the hydrolyzed pillaring agent;
    (b) contacting an aqueous slurry of a layer lattice clay selected from the group consisting of smectites, vermiculite, and flurohectorite, with said hydrolyzed solution; and
    (c) recovering the intercalated pillared clay product.

2. A method in accordance with claim 1, wherein said base is selected from the group consisting of sodium carbonate and sodium bicarbonate.

3. A method in accordance with claim 2, wherein said salt is selected from one or more members of the group consisting of ferric chloride, ferric nitrate, and ferric perchlorate.

4. A method in accordance with claim 3, wherein said base is added as a solid to a solution of said salt.

5. A method in accordance with claim 4, wherein said temperatures are maintained at about 25° C.

6. A method in accordance with any of claims 1, 2, 3 or 4, wherein said aging is carried out from 1.5 hours to 7 days.

7. A method in accordance with any of claims 1, 2, 3 or 4, wherein said aging is carried out from 8 to 16 hours.

8. A method in accordance with any of claims 1, 2, 3 or 4, wherein said intercalated pillared product is recovered by centrifuging.

9. A method in accordance with any of claims 1, 2, 3 or 4, wherein said product recovered by centrifuging is washed and air-dried.

10. A method in accordance with claim 1, wherein the concentration of metal ion in step (b), is at least 6 ions per equivalent of a said clay in the slurry.

11. A method in accordance with claim 10, wherein the concentration of ferric ion in step (b), is sufficient to provide a unit cell containing from 6.1 to 9.8 ferric ions per cell, based on chemical analysis.

12. A pillared clay selected from the group consisting of smectites, flurohectorite and vermiculite, intercalated with iron polyoxycations to provide a unit cell containing from 6.1 to 9.8 ferric ions per cell, and having a repeating spacing of at least 22 Angstroms.

13. A product in accordance with claim 12, wherein the repeating spacing is in a range of from 22 to 28 Angstroms.

14. A pillared clay product in accordance with claim 13, wherein the surface area of said product is at least 240 square meters per gram.

* * * * *